Aug. 29, 1944.    H. G. BIMMERMAN ET AL    2,356,814
TREATMENT OF MOLDS AND COMPOSITIONS THEREFOR
Filed Sept. 22, 1942
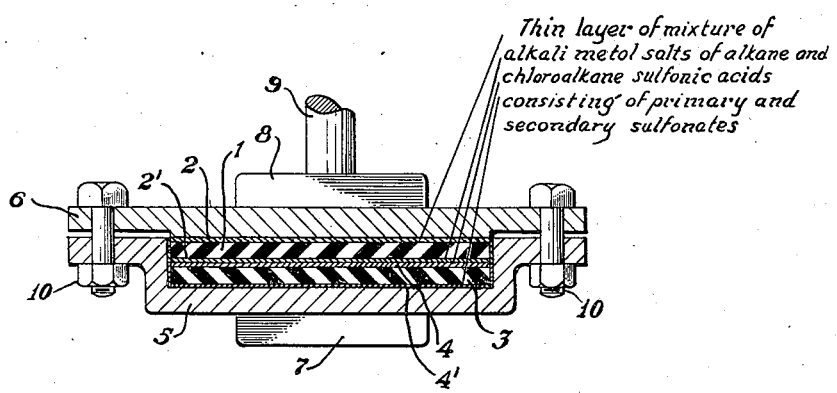
Harry G. Bimmerman
Arthur L. Fox
    INVENTORS
BY
  Lynn B. Morris
    ATTORNEY

Patented Aug. 29, 1944

2,356,814

UNITED STATES PATENT OFFICE

2,356,814

TREATMENT OF MOLDS AND COMPOSITIONS THEREFOR

Harry G. Bimmerman, Wilmington, Del., and Arthur L. Fox, Woodstown, N. J., assignors to E. I. du Pont de Nemours & Company, Wilmington, Del., a corporation of Delaware Application September 22, 1942, Serial No. 459,286

10 Claims. (Cl. 18—47)

This invention relates to improved methods of molding thermoplastic materials. More particularly, it relates to methods of preparing molds and the surfaces involved in molding operations and to improved molds for such materials. Still more particularly, it relates to processes of molding and vulcanizing natural gums and derivatives thereof and synthetic vulcanizable materials having rubber-like properties. Still more particularly it relates to methods of molding and vulcanizing rubber materials and molds suitable therefor. Still more particularly it relates to the use of a mixture of saturated aliphatic sulfonic acid water soluble salts of at least 12, and preferably 16 to 30, carbon atoms in coating the surfaces of molds used in the molding of articles from rubber materials. It also relates to methods of preventing surfaces of rubber-like and rubber plastic materials from adhering to each other or to other surfaces.

The most common method of vulcanizing rubber articles is to place the unvulcanized rubber in a steel or other metallic mold in which it is subjected simultaneously to pressure and to the necessary degree of heat for the time required to produce a properly vulcanized product. During the vulcanization the rubber flows and takes the form or imprint of whatever design or lettering may be engraved on the mold. In order to insure the satisfactory operation of the molding process, it is the general practice to treat the mold, before vulcanization, with an agent designed to prevent the rubber from adhering to the mold. Materials commonly used for this purpose are quite diverse in nature and include solutions, soap tree bark, and sodium hyposulfite and various other chemicals. They are applied to a hot mold in the form of a water solution, the water being allowed to evaporate before the unvulcanized rubber is inserted in the mold. Another common practice is to dust the mold lightly with a powder such as talc before inserting the rubber. The unvulcanized article is also often dusted with talc, mica, or some other powder to prevent adhesion and improve the surface of the finished vulcanized article. The principal shortcoming of the aforesaid methods is that if a sufficient amount of non-adhesive substance is applied before vulcanization, some of it will remain on the mold and ultimately cause a deposit to build up in the mold. When such a deposit has been built up on the mold it is more difficult to open the mold and to remove the vulcanized article. Moreover, the surface appearance of the finished product is adversely affected. It, therefore, becomes necessary to clean molds at intervals. Suitable cleaning operations consist in burning out the deposit with a torch, treating the mold with a blast of a mild abrasive powder such as soapstone, and cleaning by boiling in a solution which may be acid or alkaline in nature. It has also been proposed to use the higher alkyl sulfate ester salts as mold lubricants, as is disclosed in United States Patent 2,015,207, but such materials are somewhat expensive and have disadvantages which are described below.

An object of this invention is to provide an improved means of preventing plastic materials from adhering to the surfaces of molds. A further object is to provide an economical material which will prevent organic plastic materials, especially natural rubber and synthetic rubber-like materials, from adhering to metallic molds. A still further object is to provide water soluble materials which can be applied to metallic molds and removed therefrom by aqueous liquids. Another object is to provide metallic molds coated with materials which prevent plastic materials from adhering to mold surfaces and do not stain plastic surfaces. Still other objects will be apparent from the following description of the invention.

The disadvantages of prior art proposals described above have been overcome and the above objects attained by this invention, which embodies the treatment of mold surfaces with a dilute aqueous solution of water soluble salt of a mixture of saturated aliphatic sulfonic acids of at least 12 and, preferably 16 to 30, carbon atoms; the molds containing a thin layer of such salts, and processes of molding plastic materials utilizing such molds.

In a more limited sense the above objects are accomplished by the use of water soluble alkali metal, ammonium and amine salts of a mixture of saturated aliphatic sulfonic acids of at least 12 carbon atoms predominating in secondary monosulfonic acid salts but containing material amounts of sulfonic acid groups in excess of one in the respective hydrocarbon nuclei and minor amounts of chlorine attached to carbon.

The salts may be prepared by reacting pure alkane hydrocarbon atoms of 12 or more carbon atoms or a mixture of such hydrocarbons including fractions of refined paraffinic mineral oils containing alkane hydrocarbons of such molecular weight with admixed sulfur dioxide and chlorine substantially simultaneously while irradiating the reaction zone with actinic light, e. g., containing wave lengths from 1800 to 7000 Å. units and converting the hydrocarbon sulfonyl chlorides formed into sulfonic acid salts.

The process of preparing suitable compounds from hydrocarbon sulfur dioxide and chlorine is disclosed in U. S. Reissue 20,968 and U. S. P. 2,197,800 and involves reacting a saturated alkane or mixture of alkanes with admixed sulfur dioxide and chlorine simultaneously while irradiating the reaction zone with actinic light until a material amount has been converted into alkane sulfonyl derivatives. The sulfonyl chloride groups are then converted into sulfonic acid groups by an appropriate reaction. They may be hydrolyzed with aqueous solutions to form sulfonic acid groups which may be neutralized to form salts or they may be hydrolyzed and neutralized simultaneously, e. g., with alkali metal hydroxide solutions.

When a pure alkane of 12 or more carbon atoms is so reacted, a complex mixture of primary and secondary alkane mono- and poly-sulfonyl chlorides and chloroalkane sulfonyl chlorides are produced together with minor amounts of chloroalkanes. Upon hydrolysis and neutralization, a complex mixture of alkane and chloroalkane mono- and poly-sulfonic acid salts is formed. When a mixture of alkanes is used, a more complex mixture is formed. The chlorine and sulfur dioxide are advisedly present in from 0.75 to 1.25 mols of the former to 1 to 20 mols of the latter. In general, an excess of sulfur dioxide should be used. The sulfonyl chloride derivatives can be extracted from the unreacted hydrocarbon by means of liquid sulfur dioxide or other suitable solvents before conversion to sulfonic acid derivatives, if desired. The actinic light may contain wave lengths from 1500 to 7000 Å. Sources which emanate wave lengths predominating in 3800 to 5600 Å. are preferred. Suitable sources are given in U. S. P. 2,197,800.

Dilute aqueous solutions of water soluble salts of the above described acids are prepared and applied to the molds so as to wet and thus coat all exposed surfaces. The water is allowed to evaporate, a plastic material is placed in the mold, the molding operation concluded and the shaped article removed from the mold.

The invention will be further illustrated but is not intended to be limited by the following examples:

*Example I.*—A Pennsylvania White Oil fraction consisting of paraffinic hydrocarbons having the following characteristics:

Boiling range 295–385° C.
Saybolt Universal viscosity at 100° F. of 50 sec.
Specific gravity at 60° F. of 0.834
Refractive index at 20° C. of 1.455 was converted into a mixture of primary and secondary mono- and poly- and chlorohydrocarbon mono- and poly-sulfonic acid alkali metal salts after the manner set forth in U. S. P. 2,197,800, Example I.

*Example II.*—The solution, prepared for the test given in Example I, was used to prevent the adhesion of unvulcanized rubber pieces to each other. In this test, slabs of unvulcanized rubber .07" thick were dipped into the solution and allowed to dry. Two of these treated slabs were placed one above the other in a rubber mold having a cavity 0.125" in depth. The mold was placed between the plates of a steam-heated press and vulcanized under hydraulic pressure. After this vulcanization treatment, it was possible to separate the slabs of rubber due to the excellent lubricating qualities of the solution. A control test, in which the slabs were not treated with the solution, when vulcanized in the same manner, gave perfect adhesion and it was impossible to separate them.

The apparatus described in the above example is illustrated in the accompanying drawing wherein 1 represents an unvulcanized rubber slab which is coated, e. g., on each side with thin layers 2 and 2' respectively composed of a mixture of alkali metal salts of alkane and chloroalkane sulfonic acids consisting of primary and secondary sulfonates of the type described herein. Reference numeral 3 represents a similar rubber slab which is coated with thin layers 4 and 4' composed of the same material as layers 2 and 2'. The slabs are placed in the cavity of mold 5 which is closed by cooperating mold 6. The mold surfaces are pressed between bed member 7 and press member 8 having a piston 9 of a steam heated press. The mold surfaces have retaining members or bolts such as 10 to prevent slippage during a molding operation. The layers 2 and 2' and 4 and 4' extend over the edges of the slabs as shown thus protecting all mold surfaces from direct contact with the rubber slabs.

*Example III.*—In place of the Pennsylvania White Oil of Example I, Rodessa White Oil having the following characteristics:

Boiling range 285–337° C.
Saybolt Universal viscosity at 100° F. of 40 sec.
Specific gravity at 60° F. of .807
Refractive index at 20° C. of 1.447 was transformed to a mixture of hydrocarbon and chlorohydrocarbon mono- and poly-sulfonic acid salts predominating in the secondary type. A 1.0% solution of this material was used to coat a steel mold, used in molding rubber articles. During constant use of the mold after this treatment, there is very little tendency for the mold to become dirty through the building up of a deposit and the mold was used for a considerable period of time without cleaning. It was more effective, in preventing the adhesion of rubber and in producing a sharper molded article, than a 3.0% soap solution.

*Example IV.*—The solution, prepared for the test given in Example III, was used to prevent the adhesion of unvulcanized rubber pieces to each other. In this test, slabs of unvulcanized rubber .075" thick were dipped into the solution and allowed to dry. Two of these treated slabs were placed one above the other in a rubber mold having a cavity 0.125" in depth. The mold was placed between the plates of a steam-heated press and vulcanized under hydraulic pressure. After this vulcanization treatment, it was possible to separate the slabs of rubber due to the excellent lubricating qualities of the solution. A control test, in which the slabs were not treated with the solution, when vulcanized in the same manner, gave perfect adhesion and it was impossible to separate them.

In place of the specific mixtures of sulfonic acids set forth in the preceding examples, there may be substituted similar mixtures prepared from normal alkanes such as octane, nonane, decane, dodecane, tetradecane, hexadecane, octadecane, and mineral oil fractions predominating in one or more of such alkanes; iso-alkanes of 12 or more carbon atoms such as iso-pentadecane (made by hydrogenating tri-iso-amylene), mineral oils, particularly refined fractions such as white oil, refined gas oil, refined kerosene. Hydrocarbon derivatives obtained by reacting a hydrocarbon compound containing a saturated aliphatic open chain hydrocarbon radical of at least 8 carbon atoms with admixed sulfur dioxide and chlorine in the above manner can also be used. Thus, alcohols, ethers, carboxylic acids, esters, amides, sulphones, sulfonic acids of at least 12 carbon atoms including dodecyl, tetradecyl, hexadecyl, and octadecyl alcohols, diethyl-heptyl-carbinol, diethyl-tridecanol-6, tridecanone-8, heptadecanone-8, nonadecanone-9, pentadecanone-6, stearic, lauric, myristic, palmitic, decanoic, and erucic acids, methyl stearate, ethyl-palmitate, methyl laurate, etc., may be used as a source of suitable complex sulfonic acid mixtures for reaction with (a) admixed sulfur dioxide and chlorine or (b) sulfuryl chloride and a catalyst, while irradiating with actinic light in accordance with the procedures outlined above.

The amount of water soluble salts of the mixed sulfonic acids which may be used may vary over a fairly wide range depending on the plastic materials treated and the nature of the mold. In general, amounts from 0.05% to 2% may be used. In the case of metallic molds for rubber articles, the concentration necessary to give good results is on the order of 0.5% to 1.0%.

Various water soluble salts may be used in place of the specific ones listed in the above examples. Suitable additional ones include potassium, lithium, ammonium, and amine salts.

The salts are preferably added from water solution. However, more volatile organic solvents or mixtures of solvents can be used. Water soluble solvents such as methyl and ethyl alcohol can be used in place of all or part of the water. The salts may be dusted on as a dry powder alone or in admixture with other moldtreating materials, e. g., talc, soapstone, soap, et cetera.

Molds made of steel, cast iron, aluminum, and chromium plated steel are very effectively treated by the complex sulfonic acid salts hereof. Electroplated enameled and various other types of molds may be similarly treated.

The invention is not limited in its application to molds used in forming natural rubber articles but may be employed with molds used in the fabrication of reclaimed rubber, synthetic rubber such as polymerized chloro-2-butadiene-1,3, polystyrene, mixtures of polystyrene and butadienes, chlorinated rubber, and similar materials, as well as plastic materials in general including cellulose derivatives, e. g., cellulose nitrate, cellulose acetate, methyl cellulose, ethyl cellulose, methyl methacrylates, polyvinyl chloride, polyvinyl alcohol, phenol formaldehyde resins, urea formaldehyde resins, coumarone resins, and similar synthetic or artificial plastic molding materials.

This invention has the advantage that an inexpensive mold-treating material which can be readily applied to a mold surface is provided. A further advantage is that it may be used with a wide variety of plastic materials. A still further advantage resides in the fact that the molding coatings and any deposit which may be formed thereon during molding operations may be easily removed by a simple water washing step. A further and commercially important advantage resides in the fact that the novel complex sulfonic acid agents hereof do not adversely affect the surface of plastic materials. A still further advantage resides in the fact that the complex sulfonic acids are free from odor and do not decompose in use to objectionable byproducts. They are particularly useful in the treatment of rubber and do not cause any discoloration of rubber surfaces.

Certain oil soluble sulfonic acid compounds and water soluble sulfonic acid compounds from Mid-Continent lubricating-oil stocks have been proposed. They have an objectionable color in aqueous solutions and, furthermore, rubber products vulcanized in their presence have a discolored surface. The compounds of this invention are six times more effective than the above mentioned materials. Thus, applicants are able to use only one-sixth as much material and still get a superior result.

The higher alkyl sulfates have also been proposed as mold treating agents. These materials, however, are considerably more expensive than those of this invention. Only one-half as much of the complex sulfonic acid salts hereof, as compared with the higher alkyl sulfates, is required to get the same effect. In addition, the alkyl sulfates seem to decompose through hydrolytic action into free sulfuric acid which causes some corrosion and pitting of mold surfaces. The compounds used in accordance with the teachings hereof are free from these disadvantages.

As many apparently widely different embodiments of this invention may be made without departing from the spirit and scope thereof, it is to be understood that the invention is not limited to the specific embodiments thereof except as defined in the appended claims.

We claim:

1. The improvement in the art of molding thermoplastic materials which comprises coating the mold surfaces with a mixture of water soluble salts of alkane sulfonic acids and chloralkane sulfonic acids of at least 12 carbon atoms consisting of primary and secondary sulfonates predominating in the latter.

2. The improvement in the art of molding plastic materials which comprises coating the mold surfaces with a mixture of alkali metal salts of alkane and chloralkane sulfonic acids of at least 12 carbon atoms consisting of primary and secondary sulfonates predominating in the latter.

3. The method of treating plastic molds which comprises spraying the molding surface with a dilute aqueous solution of a mixture of water soluble alkane sulfonic acid and chloralkane sulfonic acid salts obtainable by reacting an alkane of at least 12 carbon atoms with sulfur dioxide and chlorine while irradiating the reaction zone with actinic light and converting the alkane sulfonyl chlorides formed into water soluble salts.

4. The method of preparing molds for plastic materials which comprises spraying the molding surfaces with a dilute aqueous solution of a mixture of alkali metal saturated aliphatic hydrocarbon sulfonic acid salts containing primary and secondary sulfonic acid groups and minor amounts of chlorine attached to carbon obtainable by reacting a saturated aliphatic hydrocarbon of 12–30 carbon atoms with sulfur dioxide and chlorine substantially simultaneously while irradiating with actinic light and hydrolyzing the resulting product with an aqueous alkali metal hydroxide solution.

5. The process which comprises molding rubber goods while protecting the molding surfaces with a coating of a mixture of alkali metal salts of saturated hydrocarbon sulfonic acids obtainable by reacting an alkane of at least 12 carbon atoms with sulfur dioxide and chlorine while irradiating the reaction zone with actinic light until a mixture of alkane sulfonyl chlorides and chloralkane sulfonic acids forms and converting the alkane sulfonyl chlorides formed into water soluble salts.

6. A mold coated with alkali metal salts or saturated hydrocarbon sulfonic acids obtainable by reacting an alkane of at least 12 carbon atoms with sulfur dioxide and chlorine while irradiating the reaction zone with actinic light until a mixture of alkane sulfonyl chlorides and chloralkane sulfonic acids forms and converting the alkane sulfonyl chlorides formed into water soluble salts.

7. A metallic mold coated with a thin layer of a mixture of alkali metal salts of hydrocarbon and chlorohydrocarbon primary and secondary mono- and poly-sulfonic acids obtainable by reacting a petroleum white oil consisting of paraffinic hydrocarbons and boiling between 284° C. and 306° C. with admixed sulfur dioxide and chlorine substantially simultaneously while irradiating the reaction zone with actinic light and reacting the hydrocarbon sulfonyl chlorides formed with aqueous caustic soda.

8. A metallic mold coated with a thin layer of a mixture of alkali metal salts of hydrocarbon and chlorohydrocarbon primary and secondary mono- and poly-sulfonic acids obtainable by reacting a petroleum white oil consisting of paraffinic hydrocarbons and having a Saybolt Universal viscosity of 50 seconds at 100° F., a specific gravity of 0.834 at 60° F., and a refractive index of 1.455 at 20° C. with admixed sulfur dioxide and chlorine substantially simultaneously while irradiating the reaction zone with actinic light and reacting the hydrocarbon sulfonyl chlorides formed with aqueous caustic soda.

9. In the fabrication of a rubber article by inserting said article in a mold whereby it is subjected to elevated temperatures and pressure, the step which comprises interposing between the contacting surfaces of said article and the mold a thin coating of a mixture of alkali metal salts of alkane sulfonic acids and chloralkane sulfonic acids of at least 12 carbon atoms consisting of primary and secondary sulfonates predominating in the latter.

10. A metallic mold coated with a thin layer of a mixture of alkali metal salts of alkane sulfonic acids and chloralkane sulfonic acids consisting of primary and secondary sulfonates predominating in the latter, the alkane radicals of the salts corresponding to those of the alkane radicals of a petroleum white oil consisting of paraffinic hydrocarbons and having a Saybolt Universal viscosity of 50 seconds at 100° F., a specific gravity of 0.834 at 60° F. and a refractive index of 1.455 at 20° C.

ARTHUR L. FOX.
HARRY G. BIMMERMAN